Feb. 28, 1939. E. G. CARROLL 2,148,727
HYDRAULIC BRAKE
Filed April 25, 1936 2 Sheets-Sheet 1
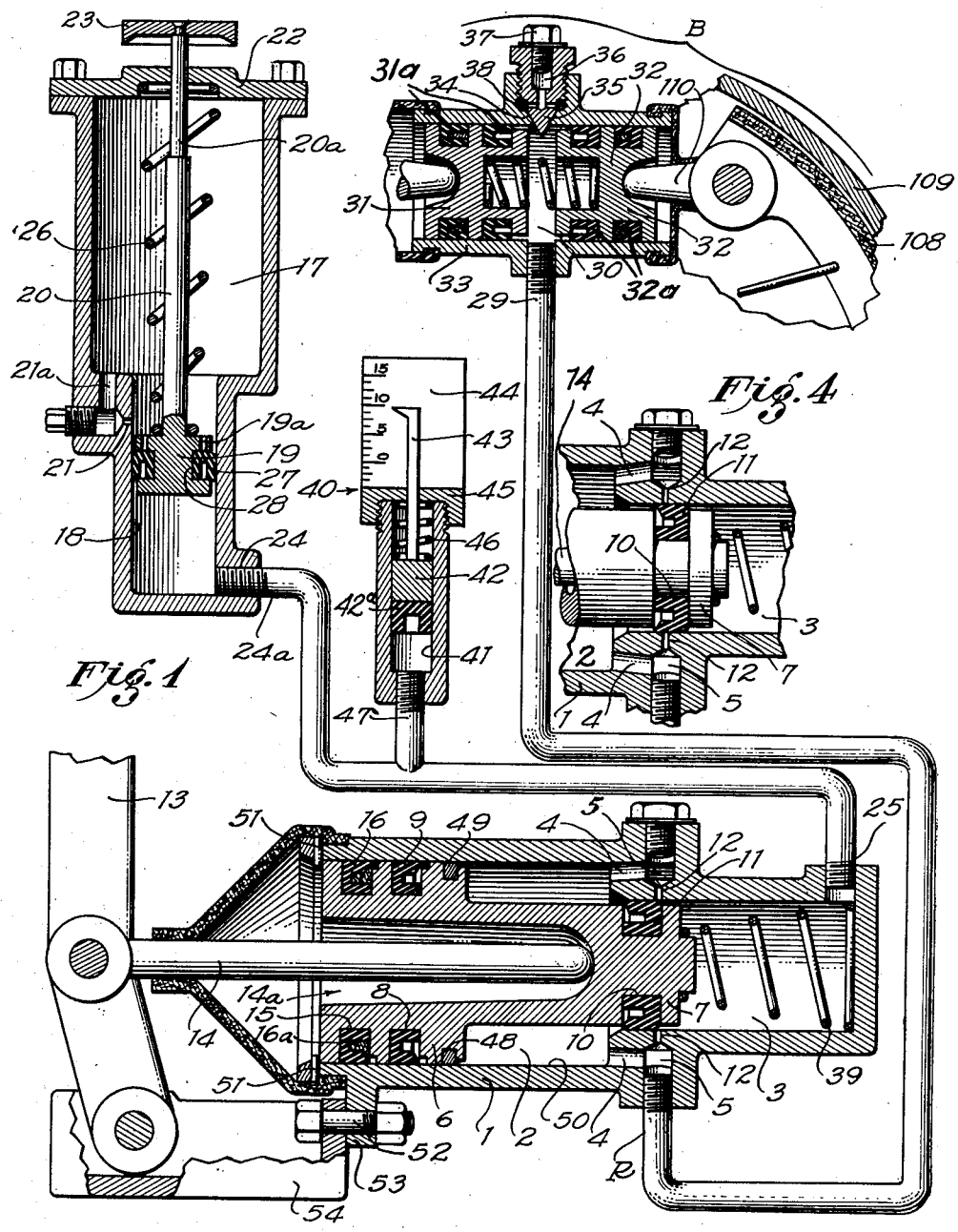
EUGENE G. CARROLL,
INVENTOR.
BY
ATTORNEY Feb. 28, 1939.   E. G. CARROLL   2,148,727
HYDRAULIC BRAKE
Filed April 25, 1936   2 Sheets-Sheet 2
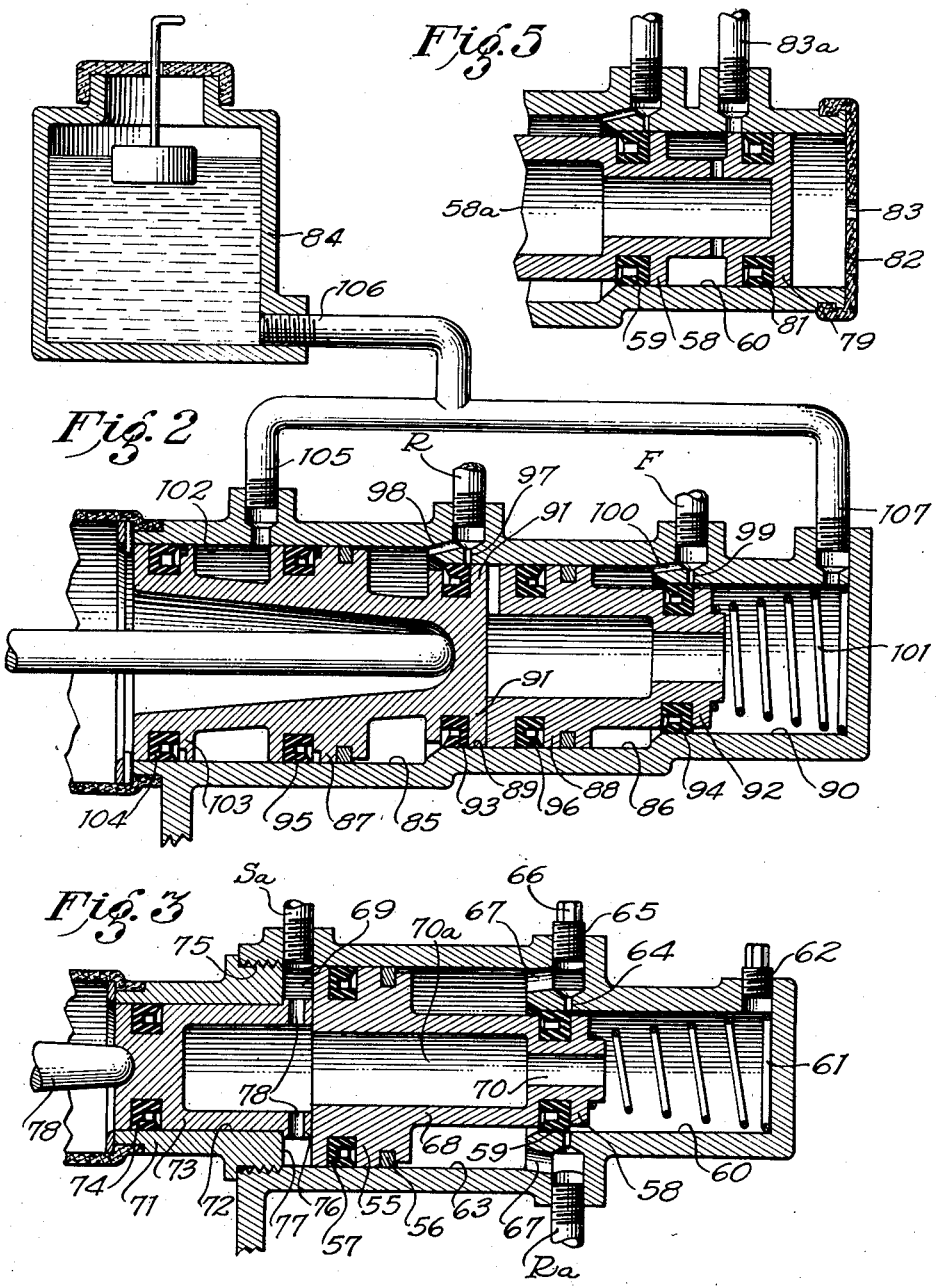

Patented Feb. 28, 1939

2,148,727

UNITED STATES PATENT OFFICE 2,148,727

HYDRAULIC BRAKE

Eugene G. Carroll, Los Angeles, Calif., assignor of fifty per cent to S. T. Hankey, Los Angeles, Calif.

Application April 25, 1936, Serial No. 76,386

17 Claims. (Cl. 60—54.5)

My invention relates to hydraulic brake systems, such as are commonly employed on automobiles, and relates particularly to an improved and unique master cylinder arrangement which may constitute a part of such hydraulic brake systems.

In order that the features and advantages of my invention may be readily understood, brief reference will be made to hydraulic braking systems in common use today. It is common practice on automobiles, for example, to provide each of the four wheels with a brake and to provide each brake with a hydraulic cylinder and piston arrangement whereby the brake shoes may be forced into engagement with the brake drum, thus applying the brake. Each of these hydraulic cylinders and pistons at each brake is connected by a conduit to a master cylinder, by means of which fluid under pressure is transmitted to the various brakes for operating them. The master cylinder is, according to ordinary practice, operably connected to the brake pedal so that when the operator of the vehicle depresses the brake pedal the piston in the master cylinder is actuated in order to develop fluid pressure for applying the various brakes.

It is an object of my invention to provide a hydraulic brake system including a master cylinder in which the pressure chamber in which the braking pressure is developed is, when the brake is in an inoperative position, in communication with a source of fluid, and in which communication with the source of fluid is closed immediately upon actuation of the piston of the master cylinder.

It is a further object of my invention to provide a hydraulic brake system, as pointed out in the preceding paragraph, in which a port connected to the source of supply is, upon operation of the piston in the master cylinder, closed by a destructible sealing member, such as a cup gasket, and in which the parts are so arranged that the pressure on opposite sides of the destructible sealing member is balanced to prevent injury thereto as the sealing member moves past the port.

It is another object of my invention to provide a hydraulic brake system in which the master cylinder is provided with a pressure cylinder in which a pressure piston is operable and in which the diameters thereof are made relatively large without, however, increasing the area of cross-section. This is advantageous in view of the fact that it is possible to provide better seals where larger diameters are employed.

It is a still further object of my invention to provide a hydraulic brake system, as pointed out heretofore, in which, when the parts are in an inoperative position, the pressure chamber in the master cylinder has superpressure applied thereto.

It is a still further object of my invention to provide a hydraulic brake system in which the master cylinder has a pair of bores in which a pair of pistons is operable, one of the bores forming a pressure chamber, and the other of the bores forming an auxiliary chamber, and in which the auxiliary chamber is connected to a source of operating fluid and in which the two chambers are connected together when the parts are in inoperative position; and furthermore in which upon initial movement of the piston in the auxiliary bore the connecting means between the two bores is closed by a port closing means carried by said last named piston.

It is another object of my invention to provide a combination as pointed out in the preceding paragraph in which the port closing means is in the form of a destructible sealing member carried by said auxiliary piston, and which has a wall adapted to close the connecting means between the two bores upon movement of the piston in the auxiliary bore, and further in which the parts are so arranged that the fluid pressure in the pressure chamber is applied to the wall of the sealing member on opposite sides so as to produce a substantially balanced pressure thereon.

It is another object of my invention to provide a hydraulic brake system in which the master cylinder has a pressure chamber and an auxiliary chamber in which pistons are operable and which are, when the parts are inactive, connected to each other, and in which upon initial movement of the parts pressure is increased in both of said chambers and thereafter the pressure chamber is disconnected from the auxiliary chamber in order that a braking pressure may be developed in said pressure chamber.

Other objects and advantages of my invention will be brought out in the course of the following detailed description of alternative forms of my invention. The forms of my invention chosen for illustration herein are not the only forms in which my invention may be embodied, and it should be understood that these forms have been selected in order to instruct those skilled in the art as to how my invention may be practiced. I do not, therefore, wish my invention to be limited to the details of construction illustrated and described hereinafter, but wish my invention to be broadly construed in accordance with the scope of the appended claims.

In the drawings:

Figure 1 is a diagrammatic view showing in cross section the principal parts of a hydraulic brake embodying this invention.

Figure 2 shows a modified master cylinder and reservoir in cross section.

Figure 3 shows a dual master cylinder and reservoir in cross section which embodies this invention.

Figure 4 is a fragmentary section of one of the master cylinders showing the cup over the compensating port.

Figure 5 is a fragmentary section showing the modification of the enlarging bore.

Referring to the form of my invention illustrated in Fig. 1, I provide a master cylinder 1 which has two bores or chambers 2 and 3; the former of which may be considered as a pressure bore, and which constitutes a pressure chamber in which the pressure of the fluid is increased in order to actuate the brakes, as will be explained hereinafter, and the bore or chamber 3 I refer to as an enlarging bore or as an auxiliary chamber; and in the preferred form of my invention I make the chamber 3 of a smaller diameter than the chamber 2 for reasons which will be explained in the course of the following description. The pressure bore 2 at its forward end, is provided with a plurality of ports 4, communicating with an annular chamber 5, which has an outlet R leading to the brake cylinders at the wheels. This outlet R may lead to all of the wheel cylinders or it may lead only to one pair, as illustrated at B in Fig. 1. In the bore 2 I provide a pressure piston 6 of a predetermined diameter and in the bore 3 I provide an enlarging or auxiliary piston 7 of a smaller predetermined diameter, which pistons are operatively connected together and cooperate to provide a structure referred to in general as a piston means. With this arrangement the effective area of the pressure piston 6 is reduced by the effective area of the enlarging piston 7.

The pressure piston 6 is provided with an annular groove 8 in which there is a cup 9 to prevent leakage of the operating liquid past the piston 6 as it is advanced in the pressure bore 2 during the braking movement. The enlarging piston 7 has an annular groove 10 in which is the cup 11 which is reversed in order to prevent leakage past the piston 7 as it is advanced in the enlarging bore 3 during the braking movement. In the bore 3 I provide a compensating port 12. The port 12 is placed immediately behind or to the right of the position occupied by the cup 11 when in the position shown in Fig. 1, and which port opens communications between the pressure bore 2, through the port 4, and the chamber 5, with the enlarging bore 3. This arrangement provides the means I use to prevent scoring of the cup as it passes over the compensating port 12 during the braking movement for the pressure in the port 12 is always exactly equal to the pressure prevailing in the pressure chamber 2 which is the same pressure as exists inside the annular flange or wall of the cup gasket 11 tending to force the same outwardly into the port 12. It will be obvious that the cup cannot be scored by the port 12 because of this balancing of the pressure acting on the inner and outer walls of the cup as it advances in the enlarging bore 3 over the port 12 during the braking movement.

Liquid may pass freely into the pressure bore 2 from the enlarging bore 3, around the piston 7 and the cup 11 because of the working clearance which necessarily exists between the piston 7 and the enlarging bore 3 and the elasticity of the cup 11. Liquid passes freely out of the pressure bore 2 through the port 4 into the chamber 5 and out of the chamber 5 through the port 12 behind the cup 11 and around the piston 7. Thus means is provided to compensate for all expansion or contraction due to changes of temperature in the liquid in the brake system or due to any other causes.

The piston 6 is advanced by the brake pedal lever 13 through the push rod 14, and when the brake pedal lever 13 is actuated to apply the brakes a thrust force is exerted through the part 14 and imparted to the piston means comprising the two pistons 6 and 7, the part 14 extending into the cavity 14a, as shown in Fig. 1. The mode of operation with this arrangement is that the pressure piston 6 forces the operating liquid out of the bore 2 through the port 4 and the connection R leading into the wheel cylinder bore 30 of the brake construction B through the outlet 29 which is a continuation of the connection or conduit R. This forces the opposed pistons 31 and 32 apart and through the connection 110 applies the brake shoe 108 to the brake drum 109.

Immediately behind the annular groove 8 and the cup 9 I provide another annular groove 15 and cup 16. This groove and cup 15 and 16 are packed with a lubricant 16a which prevents the pitting which occurs where the outer wall of the cup 9 contacts the cylinder wall of the bore 2 during the long periods when the brakes are off.

I make the cups 9, 11 and 16 and all the other cups and rubber parts throughout the system of oil resistant synthetic rubber which makes it possible to use light petroleum distillates, such as a mixture of kerosene, spray oils, ice machine oils, and light cylinder oils, instead of the expensive mixtures of castor oil and alcohol or other anti-freeze liquids now in use.

I do this because the light cylinder oil mixture has an equally low freezing point and is altogether more stable at high temperatures.

Another important advantage of the use of cylinder oil is that the lubricating qualities are better and so there is less friction and consequent wear of the cups and it is five times less expensive than castor oil mixtures. The addition of cylinder oil or vegetable oils will not cause the destruction of the cup as heretofore explained. Of course, I may make the cups of rubber and use the operating liquid now in use.

I shall now describe the means I provide to free the brake system of air and which also maintains it under any predetermined degree of supercharged pressure desired.

Still referring to Fig. 1, I provide a reservoir 17 having the bore 18, the piston 19, the rod 20 attached thereto and the compensating port 21. This rod 20 has the predetermined portion of reduced diameter 20a extending through the cover plate 22 at its center. At the end of the rod 20 I provide a handle member 23. In the lower end of the reservoir bore 18 I provide an opening 24 having a connection 24a leading to the opening 25 in the forward end of the enlarging bore 3 of the master cylinder. I also provide the compression spring 26 of predetermined strength which is adapted to act upon the piston 19. This piston 19 has the cup 27 in the groove 28 to prevent leakage of the operating fluid past the piston 19 into the reservoir 17 but permits free passage of the liquid from the reservoir 17 into the bore 18 because of the elasticity of the cup and the working clearance between the piston and the wall of the bore 18. If desired the ports 19a may be provided in the piston 19 and also in the piston 7 in the enlarging bore of the master cylinder.

With the above arrangement the mode of operation is as follows. The brake pedal lever 13 is depressed enough so that the cup 11 passes beyond the compensating port 12 in the enlarging bore 3 of the master cylinder. It is fixed in this position by inserting a wedge member of any kind between the brake pedal lever and the floor board or otherwise as may be more convenient. Figure 4 has been added to make clear the position of the cup 11 during the bleeding operation and during the early part of the braking movement when the pressure is very low. When the brakes are being applied and high pressures are developed in the operating liquid the cup is always beyond the compensating ports as about half of the advance movement of the pistons 6 and 7 is merely taking up the slack in the system due to necessary working clearances between the brake shoes 108 and the brake drums 109 at the wheels. This arrangement seals the brake system against the partial vacuum which is created in the bore 18 of the reservoir during the upward stroke of the piston 19 but permits free communication from the bore 18 of the reservoir through the connections leading to the enlarging bore 3 past the piston 17 and the cup 11 into the pressure bore 2 and through the port 4, the outlet R and the connections leading to the wheel cylinder inlet 29 thus establishing communication with the bore 30 between the opposed pistons 31 and 32 in the wheel cylinder 33. These pistons 31 and 32 are provided with suitable cup gaskets 31a and 32a in order that the pressure may be maintained in the cylinder, the rearmost of each pair of cups being packed with grease as explained in connection with cup 16 which contains non-corrosive grease 16a. This wheel cylinder 33 has the usual relief port 34 closed by the needle valve 35 which is usually formed with the bore 36 closed with the dust cap screw 37. With this arrangement when the dust cap screw 37 is removed and the needle valve is backed off its seat, air and liquid are free to flow out of the brake system as the needle valve 35 usually has the ports 38 which establish communication with the atmosphere.

It will be obvious that when the piston 19 is forced downwards in its bore 18 air will be forced into the enlarging bore 3, past the piston 7 and into the pressure bore 2, then out through the port 4 and the connections from the outlet R of the master cylinder 1 through the port 34 past the needle valve 35 through the ports 38 and the needle valve bore 36 to the atmosphere. On the back stroke of the piston 19 a partial vacuum is created in the system behind the cup 11 in its advanced position, thus causing a flow of liquid from the reservoir 17 around the piston 19 into the bore 18 which liquid gradually finds its way into the enlarging bore 3. It will be obvious that continued operation of the piston 19 in the bore 18 in this manner will quickly force all of the air out of the system and cause it to be replaced with the operating liquid. A hose is usually provided adapted to be connected to the needle valve bore so that the liquid may be collected in a suitable container. When all of the air is bled out of the braking system and the needle valve closed the piston 19 in the bore 18 in the reservoir is raised as high as the larger diameter of the stem 20 will permit, an excess amount of liquid is drawn into the bore 18 so that when the brake pedal is released by withdrawing the wedge a supercharged pressure is developed throughout the braking system equal to the force transmitted to the piston 19 by the spring 26 which, of course, is compressed on raising the piston 19 as described. The handle portion 21 of the rod 20 extends above the cover 22 and provides a gauge means.

With this arrangement should a leak occur in the system the supercharged pressure would fall and the piston 19 would be forced downwards in the bore 18 and the handle would be found to be seated on the cover 22 which would show that the system was leaking. An additional gauge 40 is provided which is adapted to be placed in constant view of the operator to indicate when leakage occurs in the brake system. At present no such arrangement is provided for the reason that a gauge directly connected to the pressure system is objectionable because it is a source of danger and trouble. This difficulty is overcome by my arrangement as the gauge is not connected to the pressure system proper. The gauge 40 has the bore 41 in which the piston and cup 42 move. Attached to the piston 42 is the stem 43 which passes through the cover 45 and is adapted to register the supercharged pressure only on the dial 44 formed on the cover 45. Acting on the piston 42 is the spring 46 of a predetermined strength. The bore 41 has the outlet 47 connected to the bore 18 in the reservoir.

With this arrangement it will be obvious that the supercharged pressure will be registered and should a leak occur the pointer rod 43 will fall as well as the handle 23 which is of the greatest importance as it provides a novel means, unconnected with the braking system proper, to warn the operator of leakage.

In the piston 6 ahead of the cup gasket or sealing member 9 I provide a groove 48 having a piston ring 49 in it. With this arrangement any leakage of the operating fluid escaping past the ring 49 during the braking movement will be trapped by the cup 9, thus preventing any loss of pressure in the braking system. I have found that piston rings of small enough diameter to use in present day master cylinders break or are badly distorted in forcing them into the grooves. With the combination of pressure piston and enlarging piston I have provided, as heretofore explained, it is possible to use a pressure piston of any desired diameter for by increasing the diameter of the enlarging piston the diameter of the pressure piston can be increased accordingly.

Another important advantage of this arrangement is due to the fact that the piston ring 49 quickly gives the wall 50 of the bore 2 a mirror-like finish which, of course, increases the life of the cup 9 by reducing abrasive wear. The life of the cup 9 is also increased because the piston ring 49 prevents loading of the cup 9 during the braking movement as the rate of leakage is very slow. I have found that none occurs after a very short time as the pressure is not over 30 lbs. per sq. inch during the actual movement of the piston.

In the enlarging or compensating bore 3 I provide the retraction spring 39 which returns the pistons 7 and 6 to their normal position of rest when the brake pedal is released. The Kieper pins 51 act as a stop and the bolt 52 and the bracket 53 indicate the usual manner of attaching the master cylinder to the frame 54 of the motor vehicle.

I provide the relief port 21 in the bore 18 of the reservoir 17 in order to relieve all abnormal pressure increases in the operating liquid due to overheating. When this occurs the piston 19 is raised by the abnormal pressure created by overheating until the port 21 is uncovered when the excess pressure is released through the ports 21 and 21a into the reservoir. The piston 19 cannot be raised higher than this because the large diameter portion of the stem 20 seats against the cover 22 of the reservoir which acts as a stop. When the liquid cools the piston 19 is forced down again by the spring 26 and the normal amount of supercharged pressure is maintained. If enough fluid were boiled out of the system through the ports 21 and 21a when the liquid remaining cooled the gauge 40 would warn of this for, of course, it would show no supercharged pressure and the handle 23 would be found seated on the cover 22 of the reservoir. By raising the handle 22 as already described liquid would be drawn into the bore 18 around the piston 19. When the handle 23 was released the spring 26 would act on the piston 19 to develop the supercharged pressure again which, of course, would raise the piston and cup 42a in the bore 41 and the pointer stem 43 would register the amount on the dial 44.

It is to be noted that liquid is forced out of the enlarging bore of the master cylinder of Figure 1 into the reservoir during the forward movement of the pistons to apply the brakes and is forced back again into the enlarging bore by the piston 19 on the return stroke. A rise of pressure in the bores 3 and 18 is caused on the forward stroke of the piston 7. This increase in pressure in the bore 3 is very advantageous as, of course, it backs up the pressure being developed in the bore 2 by the piston 6 during the braking movement and prevents a loss of pressure by the fluid escaping through the compensating port and into the small bore during the initial movement of the piston and before the sealing gasket 11 seals the compensating port. This causes pressure to immediately build up in the pressure bore upon the initial movement of the piston means and thus causes the brakes to almost immediately respond to the movement of the brake operating pedal. This action is another important feature of this invention and it is common to the cylinder shown in Figure 1 and, of course, may like all of the other features be incorporated in any hydraulic brake system having a master cylinder to develop the operating pressure to apply the brakes.

In order to provide a means to accomplish this supercharging action automatically I provide the master cylinder shown in Fig. 3 in the drawings. This master cylinder shows the same general construction as the master cylinder shown in Fig. 1 and already described. As in Fig. 1 the piston 55 having the piston ring 56 and the cup gasket 57 to trap the leakage past the piston ring 56. It will be seen that any fluid which leaks past the piston ring 56 will be scraped from the wall of the bore by the cup gasket 57 and will fill the interior thereof, thus developing a greater pressure and causing the cup gasket to cooperate with the piston ring 56 in forming a very tight seal. Also the enlarging piston 58 and the reversed cup 59 to prevent leakage past the piston 58 into the enlarging bore 60. I also provide the retraction spring 61 in the enlarging bore, also the vent 62 to permit air to escape during bleeding the brake system. The pressure bore 63 has the outlet Ra leading to the wheel cylinders. The compensating port 64 is shown associated with the vent 65 closed by the plug 66 in order to provide a means to bleed the pressure chamber of air. The compensating port acting to allow a free flow of the operating liquid out of the pressure bore 63 through the port 67 into the enlarging bore and thus relieve abnormal pressure in the system. This master cylinder therefore can be described thus far as operating in the same manner as that shown in Fig. 1. However, it has the following slight modifications which, however, are very important in that means are provided to automatically develop a supercharged pressure in the braking system as I shall now describe.

Referring to Fig. 3. First let me point out that the pistons 55 and 58 and the connecting part 68 are cored and this core provides a means for connecting the enlarging bore 60 with the space 69 behind the pressure piston 55, through the port 70 in the enlarging piston 58.

The pressure bore 63 is enclosed at its rear end by the head 71 which has the bore 72 and the piston 73 having the cup 74 to prevent leakage past the piston 73. The head 71 has the threaded portion 75 which screws into the similar threaded portion of the bore 63. The piston 73 has the enlarged diameter 76 which acts as a stop seating against the forward face 77 of the head 71 and thus maintaining the parts in established relationship when the brakes are off and makes it unnecessary to provide a Kieper ring or the like as is usual.

The enlarged diameter of the piston 73 in the bore of the head 71 has the ports 78 to provide a means of communication between the enlarging bore 60 through the port 70 in the piston 58 and the core 70a with the space 69 behind the pressure piston 55. The space 69 has the connection Sa leading to bore 18 of the reservoir 17 of Figure 1.

The mode of operation of this master cylinder in Figure 3 is as follows. When the brake pedal is depressed the force is transmitted to the push rod 78, which is shown broken away from the brake pedal, and the piston 73 in the bore 72 of the head 71. The piston 73 transmits the force to the pressure piston 55 which is moved forward in its bore 63 moving the enlarging piston 58 forward in its bore 60 in unison closing and passing the compensating port 64. Operating liquid is forced out of the pressure bore 63 by the piston 55 through the port 67 and the connection Ra leading to the wheel cylinders as shown in Figure 1 with the master cylinder 1. At the same time liquid is forced out of the forward end of the bore 60 by the advance of the enlarging piston 58 which passes to the space 69 behind the pressure piston 55 through the port 70 and the core 70a for the space 69 is enlarging as the piston 55 moves forwardly. At the same time liquid is being drawn from the reservoir of Figure 1 through the connection Sa because the effective area of the rear of piston 55 is greater than the effective area of the piston 58 so the volume of liquid forced out of the enlarging bore by the advance of the piston 58 in it is not enough to overcome the partial vacuum created in the chamber 69. It will be seen that the liquid thus drawn through the pipe Sa cooperates with the fluid already contained in the auxiliary chamber 60 in filling the space 69, ports 78, the bore 70a, and the auxiliary chamber or small bore 60. On the return stroke of the piston 55 the liquid which was forced out of the bore 60 into the chamber 69 through the piston 58 is forced back again at the same time the excess drawn from the reservoir around the piston 19 is being forced into the bore 18 and thus the piston 19 is raised in the bore 18 compressing the spring 26. It is obvious that this arrangement will cause the automatic formation of a supercharged pressure throughout the braking system, the chamber 69 being connected to the bore 18 of the reservoir 17 as shown in Figure 1.

Figure 5 in the drawings has been added to illustrate a modification of the enlarging piston 58 and the bore 60 with which there would be no flow of liquid out of the bore 60 during the braking movement. The piston 58 of Figure 3 is the piston 58 of Figure 5 and the bore 60 is the bore 60. The pressure piston is broken away at the line 58a. The piston 79 has been added to the piston 58. The piston 58 has the cup 59 and the piston 79 has the cup 81 to prevent leakage past them. With this arrangement there is no change of volume of the liquid in the bore 60 during the braking movement and the bore is open. The end being merely closed by the boot 82 in which is the vent hole 83. The bore 60 has the connection 83a leading to a reservoir (not shown). With this arrangement and due to the fact that there is no change in volume in the liquid in the bore 60 during the braking movement the reservoir may be open to the atmosphere as shown in the form of my invention of Figure 2 which I will now describe.

In Figure 2 I have provided two pressure bores 85 and 86 in which the two pressure pistons 87 and 88 are placed, and the two enlarging bores 89 and 90 in which the two enlarging pistons 91 and 92 are placed. The cylinder therefor provides three bores 85, 86, and 90 which may be referred to as a large bore, an intermediate bore, and a small bore, respectively. The pistons 91 and 92 have the cups 93 and 94 to prevent leakage past the pistons during the braking movement and the pistons 87 and 88 have the cups 95 and 96 to prevent leakage past the pistons 87 and 88. The pressure bore 85 has the connection R leading to the rear wheel brakes (not shown) and the pressure bore 86 has the connection F leading to the forward wheel brakes (not shown) of the motor vehicle. The pressure bore 85 has the compensating port 97 establishing connection between the bore 85 and the enlarging bore 89 through the port 98 and the bore 86 has the compensating port 99 to establish connection with the enlarging bore 90 through the port 100 when the brakes are off. The retraction spring 101 is provided in the bore 90 to aid in returning the parts to their position of rest after an application of the brakes. The mode of operation is exactly the same as if two cylinders such as shown and described in Figure 1 were placed in tandem, with this difference that the bore 89 is cast concentrically with and as a part of or continuation of the bore 86 and may be said to act as an enlarging bore for the pressure bore 85 and a pressure bore 86 for the enlarging bore 90. The rear chamber having the piston 103 and the cup 104 is joined to the pressure piston 87 so as to move in unison with it and the pistons 91 and 92 during the braking movement as shown. The bore 102 has the outlet and connection 105 leading to the connection 106 in the reservoir 84, and the connection 106 leads to the connection 107 in the enlarging bore 90. The pistons 88 and 92 are cored as shown so that communication may be established between the reservoir and the enlarging bore 89. This arrangement provides a means to permit a flow of liquid into or out of the port 96 to compensate for all changes of temperature in the liquid in the rear braking system.

The effective areas of the pressure pistons 87 and 88 are exactly equal so the same quantity of liquid is forced out of the pressure bore 85 by the pressure piston 87 to the rear brakes as is forced out of the pressure bore 86 by the pressure piston 88 to operate the forward brakes.

With this arrangement should the line leading to the rear brakes break the forward brakes would still function efficiently which is a very advantageous feature.

With this explanation I do not wish to be limited to the forms and combinations shown in the drawings as the different features of this invention may be used wholly or in part in any hydraulic brake system for motor vehicles or the like.

I claim:

1. In combination with a hydraulic brake for a motor vehicle having a brake pedal, wheel brakes, wheel brake operating cylinders, a reservoir and an operating liquid, the combination of master cylinder means having two bores, pistons working in said bores in unison with each other, one of said bores being of relatively large diameter and connected with the wheel braking operating cylinders, and the other bore being of relatively small diameter and connected with the reservoir, said bores having a compensating port connecting the same, said compensating port being at all times in communication with said bore of larger diameter whereby there is developed the same degree of pressure in the operating liquid in the said compensating port and the said bore of larger diameter during the braking movement, and packing means for closing communication between said compensating port and said bore of smaller diameter when said pistons are moved in a direction to produce a brake operating pressure.

2. In combination with a hydraulic braking system for motor vehicles which includes a brake pedal, wheel brakes, hydraulic cylinders connected therewith and filled with an operating fluid, the combination of a compensating cylinder having a pair of longitudinally aligned bores of different diameters, a piston having portions fitting each of said bores and reciprocating in unison therein, said piston being so positioned that a large chamber is formed in the portion of said larger bore adjacent said smaller bore and being provided with an operating connection with the brake pedal for moving said piston in a direction toward said smaller diameter bore, and the larger of said cylinder bores having a fluid conduit connecting with a brake cylinder, the bore of smaller diameter being connected with a source of supply of operating fluid, and a compensating port through which communication is established between the bores of the cylinder when the piston is in its retracted position and which communication is interrupted when the piston moves on its operating stroke.

3. In combination with a hydraulic brake system including a fluid reservoir, a brake, a hydraulic cylinder for the brake, and a brake pedal, a compensating unit comprising a cylinder having two longitudinally aligned bores, one of large diameter at the end of which is a closed bore relatively smaller in diameter, a piston having a main portion fitting the large bore and end portion projecting into the small bore, said piston being operatively connected to the brake pedal for reciprocation thereof, the large bore having a fluid conduit placing it in communication with the brake operating cylinder and the small bore having a fluid conduit placing it in constant communication with the fluid reservoir, a by-pass port establishing communication between the two cylinder bores when the piston is in its retracted position, said piston carrying packing means producing a fluid tight seal between the two cylinder bores and being positioned upon the reduced extension of the piston to interrupt communication through said compensating port when said piston is advanced while creating separate hydraulic pressures within the two bores and the conduits communicating therewith.

4. In a hydraulic brake system which includes a brake, a hydraulic brake operating means, and actuating means, the combination of: a cylinder having a large bore and a small bore; piston means having a large piston operable in said large bore and a small piston operable in said small bore; conduit means connecting said large bore with said hydraulic brake operating means; means for supplying fluid to said small bore; walls providing a port communicating between said bores; interconnecting means connected to said actuating means whereby said piston means is moved to operate said hydraulic brake operating means; and port closing means on said small piston for closing said port upon actuation of said piston means.

5. In a hydraulic brake system which includes a brake, a hydraulic brake operating means, and actuating means, the combination of: a cylinder having a large bore and a small bore; piston means having a large piston operable in said large bore and a small piston operable in said small bore; conduit means connecting said large bore with said hydraulic brake operating means; means for supplying fluid to said small bore; walls providing a port communicating between said bores; interconnecting means connected to said actuating means whereby said piston means is moved in a direction toward said small bore to operate said hydraulic brake operating means; and port closing means on said piston means for closing said port upon actuation of said piston means.

6. In a hydraulic brake system which includes a brake, a hydraulic brake operating means, and actuating means, the combination of: a cylinder having a large bore and a small bore; piston means having a large piston operable in said large bore and a small piston operable in said small bore; conduit means connecting said large bore with said hydraulic brake operating means; means for supplying fluid to said small bore; walls providing a port communicating between said bores; interconnecting means connected to said actuating means whereby said piston means is moved to operate said hydraulic brake operating means; and sealing means on said small piston for preventing fluid from flowing around said small piston from said large bore to said small bore, said sealing means closing said port upon actuation of said piston means.

7. In a hydraulic brake system which includes a brake, a hydraulic brake operating means, and actuating means, the combination of: a cylinder having a large bore and a small bore; piston means having a large piston operable in said large bore and a small piston operable in said small bore; conduit means connecting said large bore with said hydraulic brake operating means; means for supplying fluid to said small bore; walls providing a port communicating between said bores; interconnecting means connected to said actuating means whereby said piston means is moved to operate said hydraulic brake operating means; and port closing means on said small piston for closing said port upon actuation of said piston means.

8. In a hydraulic brake system which includes a brake a hydraulic brake operating means, and actuating means, the combination of: a cylinder having a large bore and a small bore; piston means having a large piston operable in said large bore and a small piston operable in said small bore; conduit means connecting said large bore with said hydraulic brake operating means; means for supplying fluid to said small bore; walls providing a port communicating between said bores; interconnecting means connected to said actuating means whereby said piston means is moved to operate said hydraulic brake operating means; and sealing means in the form of a pliable cup gasket mounted on said small piston for preventing fluid from flowing around said small piston from said large bore to said small bore, said sealing means closing said port upon actuation of said piston means.

9. In a hydraulic brake system which includes a brake, a hydraulic brake operating means, and actuating means, the combination of: a cylinder providing a pair of bores; a piston means having a pressure piston in one of said bores and forming a pressure chamber therein connected to said hydraulic brake operating means, and having an auxiliary piston in the other of said bores and providing an auxiliary chamber therein connected to a source of operating fluid; walls forming a port connecting said chambers; interconnecting means connecting said actuating means and said piston means for moving same in a direction toward said auxiliary chamber for reducing the size of said pressure chamber; and port closing means on said auxiliary piston for closing said port upon actuation of said piston means.

10. In a hydraulic brake system which includes a brake, a hydraulic brake operating means, and actuating means, the combination of: a cylinder providing a pair of bores; a piston means having a pressure piston in one of said bores and forming a pressure chamber therein connected to said hydraulic brake operating means, and having an auxiliary piston in the other of said bores and providing an auxiliary chamber therein connected to a source of operating fluid; walls forming a port connecting said chambers; interconnecting means connecting said actuating means and said piston means for moving same in a direction toward said auxiliary chamber for reducing the size of said pressure chamber; and a destructible sealing member carried by said auxiliary piston and having a wall adapted to close said port upon movement of said auxiliary piston, the fluid pressure in said pressure chamber being applied to said wall from said chamber on one side and through said port on the opposite side.

11. In a hydraulic brake system which includes a brake, a hydraulic brake operating means, and actuating means, the combination of: a cylinder having a large bore, an intermediate bore, and a small bore; piston means having a large piston operable in said large bore, an intermediate piston operable in said intermediate bore, and a small piston operable in said small bore; conduit means connecting said large bore and said intermediate bore with said hydraulic brake operating means; means for supplying fluid to said small bore; walls providing ports communicating between said small bore and said intermediate bore and said small bore and said large bore; interconnecting means connected to said actuating means whereby said piston means is moved to operate said hydraulic brake operating means; and port closing means on said piston means for closing said ports upon actuation of said piston means.

12. In a hydraulic brake system which includes a brake, a hydraulic brake operating means, and actuating means, the combination of: a cylinder providing three bores; a piston means having a pair of pressure pistons, one in each of two of said bores, and forming pressure chambers therein connected to said hydraulic brake operating means, and having an auxiliary piston in the third of said bores and providing an auxiliary chamber therein connected to a source of operating fluid; walls forming ports connecting said pressure chambers to said auxiliary chamber; interconnecting means connecting said actuating means and said piston means for moving same in a direction toward said auxiliary chamber for reducing the size of said pressure chambers; and port closing means on said piston means for closing said ports upon actuation of said piston means.

13. In combination with a hydraulic braking system for motor vehicles which includes a brake pedal, wheel brakes, hydraulic cylinders connected therewith and filled with an operating fluid, the combination of a compensating cylinder having a pair of longitudinally aligned bores of different diameters, a piston having portions fitting each of said bores and reciprocating in unison therein, said piston being so positioned that a large chamber is formed in the portion of said larger bore adjacent said smaller bore and being provided with an operating connection with the brake pedal for moving said piston in a direction toward said smaller diameter bore, and the larger of said cylinder bores having a fluid conduit connecting with a brake cylinder, the bore of smaller diameter being connected with a source of supply of operating fluid under supercharged pressure, and a compensating port through which communication is established between the bores of the cylinder when the piston is in its retracted position, and which communication is interrupted when the piston moves on its operating stroke.

14. In a hydraulic brake system which includes a brake, a hydraulic brake operating means, and actuating means, the combination of: a cylinder having a large bore and a small bore; piston means having a large piston operable in said large bore and a small piston operable in said small bore; conduit means connecting said large bore with said hydraulic brake operating means; means for supplying fluid to said small bore under supercharged pressure; walls providing a port communicating between said bores; interconnecting means connected to said actuating means whereby said piston means is moved to operate said hydraulic brake operating means; and port closing means on said small piston for closing said port upon actuation of said piston means.

15. In a hydraulic brake system which includes a brake, a hydraulic brake operating means, and actuating means, the combination of: a cylinder having a large bore and a small bore; piston means having a large piston operable in said large bore and a small piston operable in said small bore; conduit means connecting said large bore with said hydraulic brake operating means; means for supplying fluid to said small bore under supercharged pressure; walls providing a port communicating between said bores; interconnecting means connected to said actuating means whereby said piston means is moved in a direction toward said small bore to operate said hydraulic brake operating means; and port closing means on said piston means for closing said port upon actuation of said piston means.

16. In a hydraulic brake system which includes a brake, a hydraulic brake operating means, and actuating means, the combination of: a cylinder having a large bore and a small bore; piston means having a large piston operable in said large bore and a small piston operable in said small bore; conduit means connecting said large bore with said hydraulic brake operating means; means for supplying fluid to said small bore under supercharged pressure; walls providing a port communicating between said bores; interconnecting means connected to said actuating means whereby said piston means is moved to operate said hydraulic brake operating means; and sealing means on said small piston for preventing fluid from flowing around said small piston from said large bore to said small bore, said sealing means closing said port upon actuation of said piston means 17. In a hydraulic brake system which includes a brake, a hydraulic brake operating means, and actuating means, the combination of: a cylinder providing a pair of bores; a piston means having a pressure piston in one of said bores and forming a pressure chamber therein connected to said hydraulic brake operating means, and having an auxiliary piston in the other of said bores and providing an auxiliary chamber; a source of operating liquid under supercharged pressure connected to said auxiliary chamber; walls forming a port connecting said chambers; interconnecting means connecting said actuating means and said piston means for moving same in a direction toward said auxiliary chamber for reducing the size of said pressure chamber; and port closing means on said auxiliary piston for closing said port upon actuation of said piston means.

EUGENE G. CARROLL.